United States Patent [19]

Tatar

[11] 4,346,940
[45] Aug. 31, 1982

[54] WHEEL COVER LOCKING ASSEMBLIES

[75] Inventor: Richard Tatar, Walton, N.Y.

[73] Assignee: Del-Met Corporation, Walton, N.Y.

[21] Appl. No.: 166,056

[22] Filed: Jul. 7, 1980

[51] Int. Cl.³ .............................................. B60B 7/00
[52] U.S. Cl. .................................. 301/37 AT; 70/168; 70/232
[58] Field of Search .................. 301/37 R, 37 AT; 70/163, 164, 166–168, 229, 232

[56] References Cited

U.S. PATENT DOCUMENTS

| | | | |
|---|---|---|---|
| 1,659,702 | 2/1928 | Raleigh | 70/232 |
| 1,854,488 | 4/1932 | Root | 70/232 |
| 2,722,822 | 11/1955 | Thomas | 70/167 |
| 3,534,570 | 10/1970 | Mauto | 70/167 |
| 3,965,708 | 6/1976 | Smiley | 301/37 AT |

Primary Examiner—H. Grant Skaggs
Attorney, Agent, or Firm—Richard G. Stephens

[57] ABSTRACT

A wheel cover locking assembly comprises a knob in which a plastic bolt is rotatably mounted, the bolt extending through a wheel cover and engaging a nut carried on a bracket affixed to a wheel by means of lug nuts, so that rotation of the bolt locks the wheel cover on the wheel. A cam piece located inside the knob and hidden by a snap-in decorative cover can be rotated by means of a simple key to clutch and de-clutch the knob to and from the bolt. The simplified and economical construction tends to be impervious to water and dirt.

5 Claims, 15 Drawing Figures

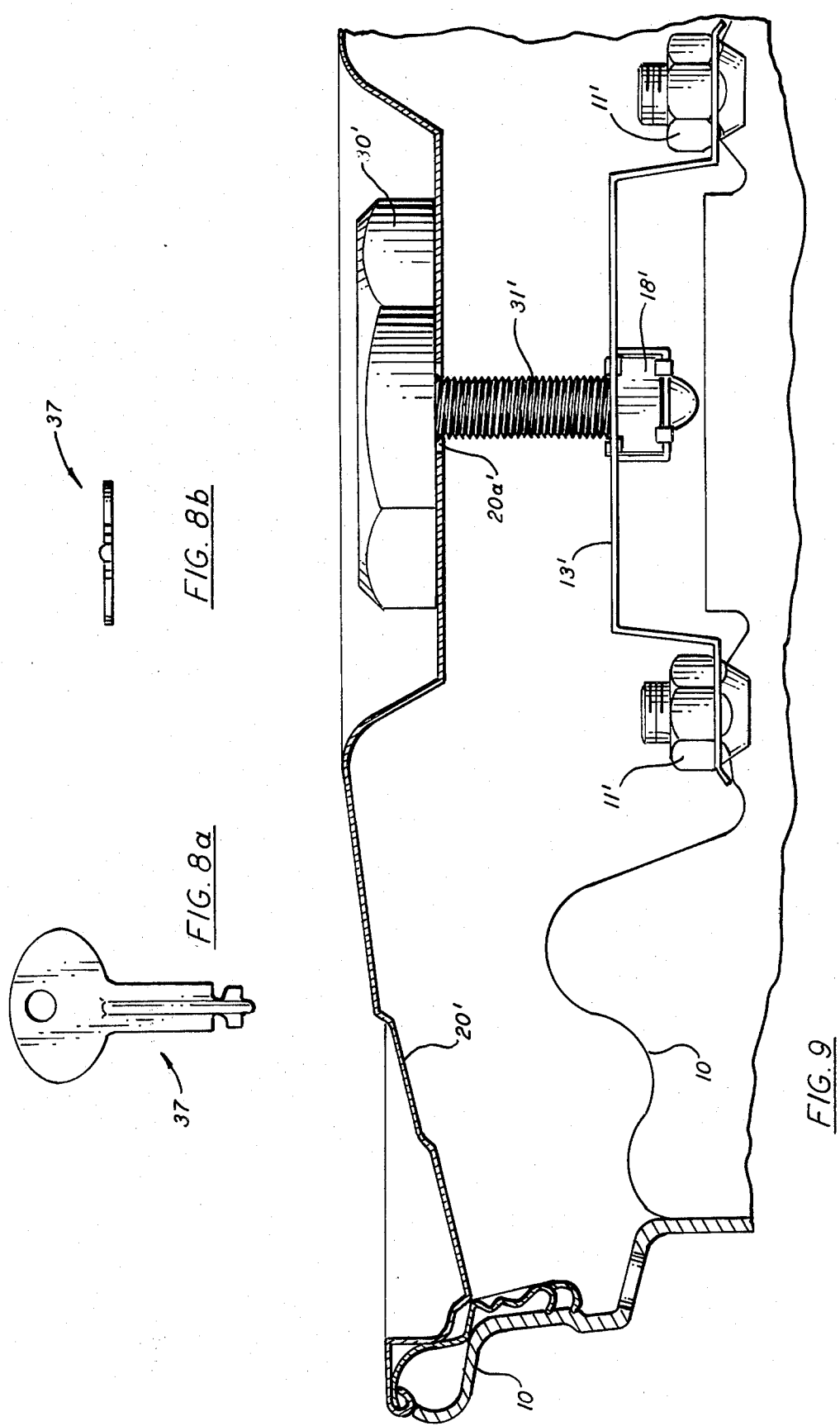

WHEEL COVER LOCKING ASSEMBLIES

This invention relates to improved apparatus for locking wheel covers onto automotive vehicles to prevent theft, or accidental loss in the event that the cover-rim retention means fails. Various prior art devices provided for the same general purpose have had various disadvantages which the present invention is intended to overcome. Some related prior art which may be of interest is shown in the following U.S. Pat. Nos. 1,828,658; 1,921,434; 2,601,017; 4,193,640.

One object of the invention is to provide an improved wheel cover locking assembly which is highly impervious to dirt and corrosion, and simple and economical for manufacture, yet extremely difficult to defeat and unlock without use of a proper key. Various wheel cover locks which have been proposed use expensive tumbler-type lock barrels similar to those commonly used on car doors and trunk lids, such locks having spring-biased cover plates intended to bar entry of moisture and dirt. Such locks are often unsatisfactory for use on wheel covers. Mounting such locks down on automobile wheels subjects them to much worse environments, and subjecting them to much splashing of mud and dirty water, and sometimes submerging them, with the result that they jam and cannot be operated. An inability to remove a wheel cover when one has a flat tire can cause great inconvenience.

Various attempts have been made to provide simpler forms of wheel cover locks less likely to jam, but so far as I am aware none has been very successful. One prior form of lock, for example, is unsatisfactory in that it allows rather easy access to a bolt head, allowing a thief to remove a wheel cover if he is merely equipped with standard tools, such as a pair of pliers, or a socket wrench. An important object of the invention is to provide an inexpensive wheel cover locking assembly less easily defeated.

Some added objects of the invention are to provide an improved wheel cover locking assembly which does not require any chains or cables or like parts subject to appreciable wear due to vibration, an assembly which is simple and economical to construct, and easy for an owner to install and remove. Another object of the invention is to provide an improved wheel cover locking assembly in which a central decorative hub-like knob serves as a convenient means allowing an operator to apply substantial torque to tighten or loosen a threaded bolt.

Many of the most expensive wheel covers which are most attractive to thieves are not supplied as original equipment on automobiles, but instead purchased and installed by car owners. A variety of different wheel diameter and lug configuration combinations are used on different automobiles. Another object of the present invention is to provide an improved wheel cover locking assembly having increased utility, such that a single assembly may be used interchangeably on numerous differing automobiles, thereby offering significant manufacturing and distribution economies.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 8a and 8b are side and end views, respectively of one form of key which may be used to lock and unlock the locking assembly.

FIG. 9 is a partial cross-section view illustrating a modified form of the invention installed to lock a different form of wheel cover on a tire rim.

Figure 1:
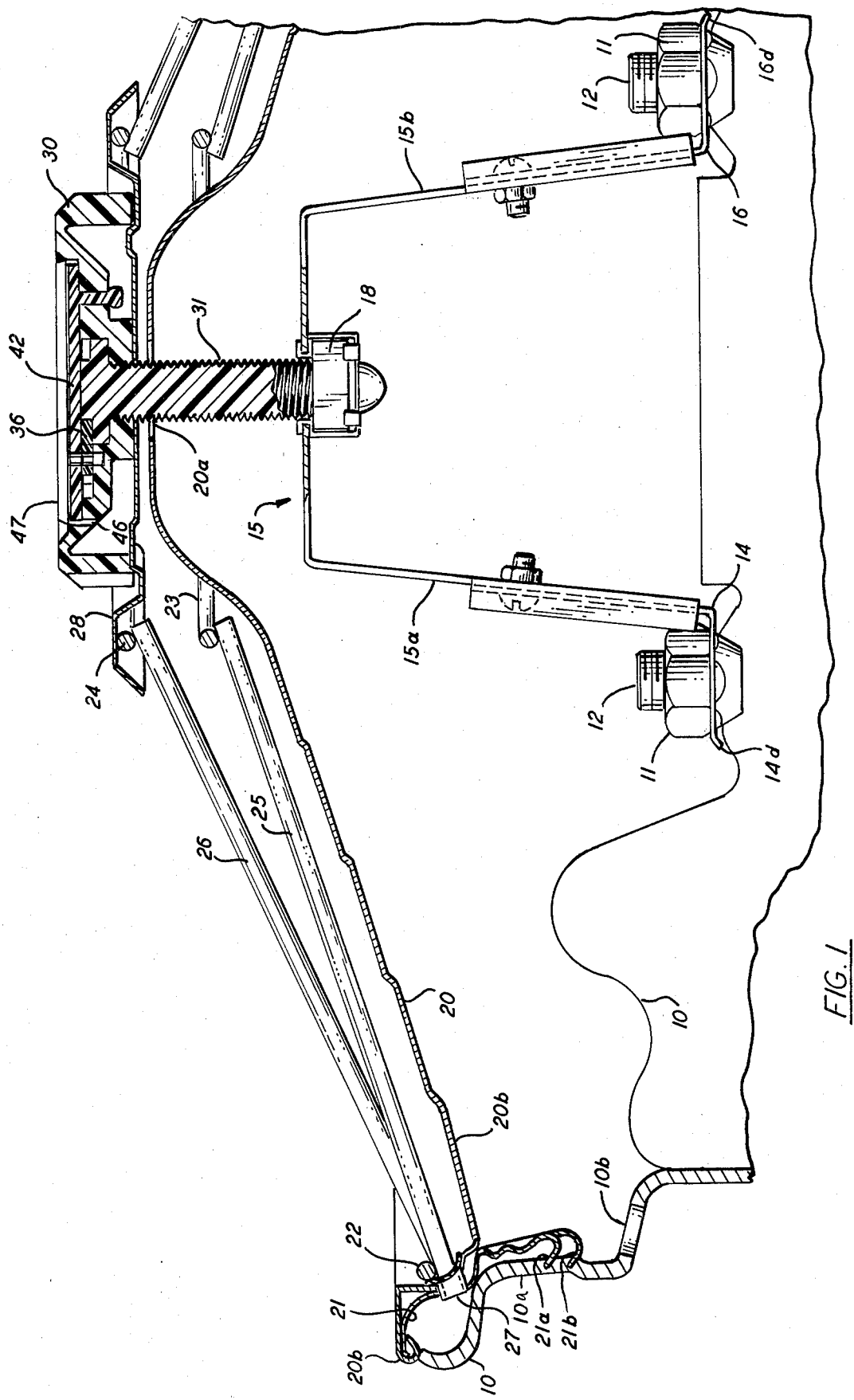
FIG. 1 is a partial cross-section view illustrating one form of the present invention installed to lock a wire-wheel-simulating wheel cover on a tire rim.

Referring to FIG. 1 a wheel cover locking assembly in accordance with one form of the present invention is shown installed to lock a wirewheel simulating wheel cover on a conventional wheel rim 10, which rim is only partially shown. Rim 10 is fastened to the vehicle in conventional fashion by a plurality of tapered lug nuts, two of which are shown at 11,11 threaded onto conventional studs 12,12. Either four or five studs and lug nuts are used on most automobile wheels. The tapered sides of the lug nuts engage mating tapered recesses in the wheel rim. Lug nuts must be tightened with substantial torques to properly secure the wheel to the vehicle. No structure can be safely interposed between the mating tapers.

Figure 2:
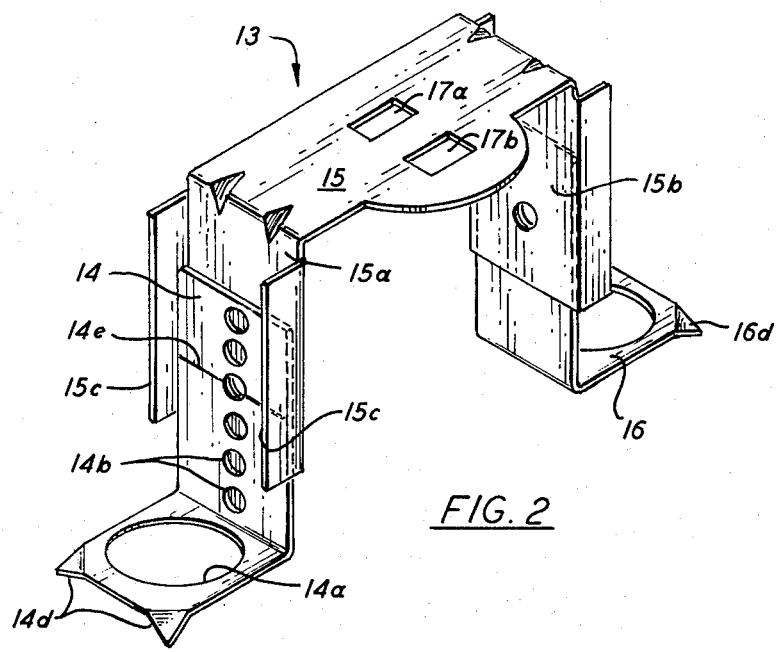
FIG. 2 is an isometric view illustrating an adjustable mounting bracket portion of the assembly shown in FIG. 1.

An adjustable mounting bracket 13 is shown secured under the two lug nuts 11,11 in FIG. 1. Bracket 13 is also shown in FIG. 2. Importantly, mounting holes 14a and 16a in the outer leg portions 14 and 16 of bracket 13 have an oversize diameter, so that the lug nuts, when fully tightened, retain the bracket in a very secure but loose fashion. The edges of mounting holes 14a and 16a engage tapered portions of the lug nuts slightly axially outwardly from rim 10, so that the bracket legs 14 and 16 do not touch the rim when the locking device is fully installed. When bracket 13 is first installed on the pair of studs and captured thereon by the lug nuts, it is held loosely by reason of the size of mounting holes 14a, 16a and the tapers on the lug nuts, and it can rattle, with the legs 14 and 16 moving axially from the positions shown to where they touch rim 10. However, when the locking assembly is fully installed, a threaded nylon bolt 31 applies an axially outward pull to bracket 13, preventing any rattle and maintaining the bracket legs 14 and 16 in the position shown, slightly clear of rim 10. The use of oversize mounting holes to prevent interference with lug nut tightening is not believed per se to be new.

In order that a given assembly be usable with a large variety of wheel covers having different axial protrusions, bracket 13 is made axially adjustable. As best seen in FIG. 2, outer legs 14 and 16 are each provided with a plurality of spaced-apart holes 14b and 16b. Central member 15 of bracket 13 has a single hole in each of its leg portions 15a, 15b. A screw, lockwasher and nut secures outer leg 14 to leg portion 15a, and outer leg 16 is similarly secured to leg portion 15b, and the axial position of central member 15 manifestly depends upon which holes are used in legs 14 and 16. Legs 14 and 16 are each preferably provided with score lines, such as that shown at 14e in FIG. 2, allowing those legs to be broken off and shortened, if desired, further increasing the versatility of the mounting bracket. The leg portions 15a and 15b are each shown with outwardly extending flanges 15c which prevent central member 15 of the bracket from rotating about the axis of the screws, hence maintaining the plane of the central portion of member 15 perpendicular to the wheel axis when the bracket 13 is installed. The flanges also serve to stiffen the legs of the bracket. The general purpose of bracket 13 is to securely locate a nut on the wheel axis at a proper outward distance from the rim.

Figure 3A:
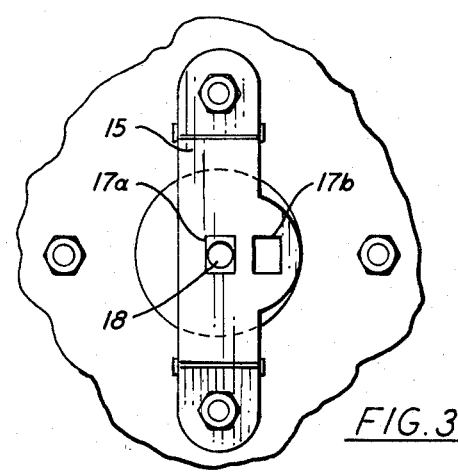
FIGS. 3a and 3b are diagrams illustrating how the mounting bracket can be used with two differing wheel lug configurations.
Figure 3B:
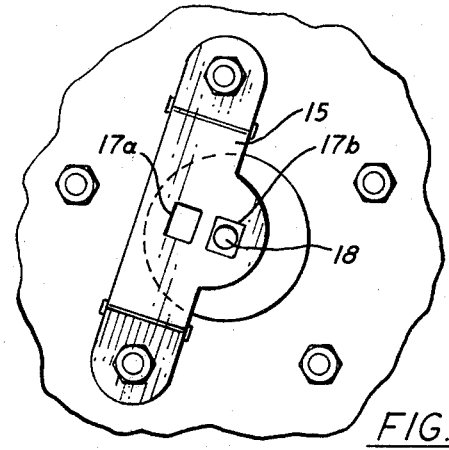

A pair of square holes 17a, 17b are shown provided in bracket 13, and a spring-encased clip nut 18 is inserted in one or the other of the square holes. When the locking assembly is used with a 4-lug wheel having a lug configuration of the nature shown in FIG. 3a, clip nut 18 is mounted in hole 17a, and conversely, when the assembly is instead used with a five-lug configuration of the type shown in FIG. 3b, clip nut 18 is instead mounted in hole 17b, in either case locating the axis of the clip nut on the axis of the wheel. It will be apparent that central portion 15 of bracket 13 could be enlarged and provided with further square holes, if desired, to accommodate even additional lug configurations. It should be noted that bracket 13 can readily be used with a variety of different wheel diameters where the studs lie different radial distances from the wheel axis, since legs 15a and 15b can be readily sprung radially inwardly or outwardly. Clip nut 18 comprises a commercially available nut device comprising a nut carried in a spring clip, and an interfering type of nut is preferably used, with a small nylon pin extending partway into the threaded bore of the nut to engage threads of nylon bolt 31 and provide increased friction, lessening any tendency for bolt 31 to loosen due to vibration.

A typical wheel cover is shown in FIG. 1 as comprising a generally annular underpan 20 having a central aperture 20a, and a turned peripheral rim 20b which holds a retaining ring 21. Retaining ring 21 includes a plurality of spring fingers 21a, 21b which engage intermediate flange 10a of rim 10 at numerous places around the circumference of the rim to hold the wheel cover on the rim. The present invention does not require that the wheel cover use the particular form of spring fingers shown in FIG. 1, though they are preferred. The wheel cover is shown also including a rigid wire basket comprising an outer wire ring 22, two central wire rings 23,24, and a plurality of wire spokes 25,26 extending between and welded to outer ring 22 and either ring 23 or ring 24. A typical basket may have 36 spokes, for example. Four plastic grommets such as that shown at 27 are fitted on the ends of four of the spokes, ninety degrees apart around the wheel, to allow the basket to seat on the underpan without metal-to-metal contact. One spoke 27 may be longer than the others as shown in FIG. 1, and may extend through a hole in underpan 20 to prevent the wire basket from rotating relative to the underpan. A hole 20b in underpan 20 is aligned with valve stem hole 10b in rim 10 to allow a conventional tire valve stem (not shown) to project through hole 20b. The wheel cover assembly also includes a generally-annular metal outer pan 28 which seats against wire ring 24.

Figure 5A:
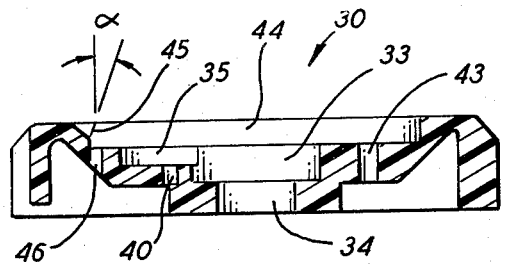
FIGS. 5a and 5b are cross-section and top views, respectively, of a molded plastic knob member portion of the assembly.
Figure 5B:
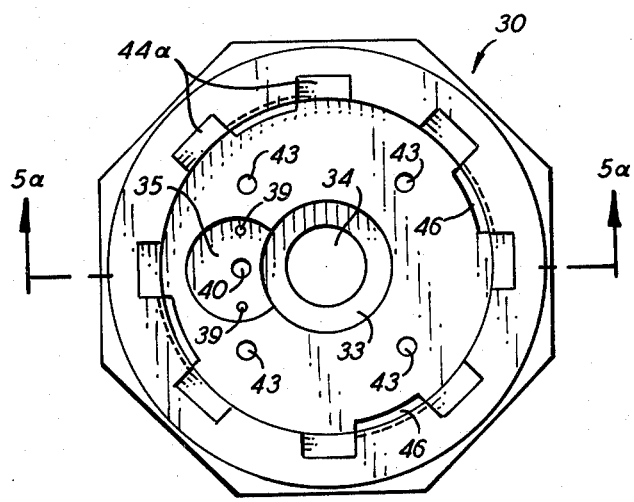

In accordance with the present invention, a rotatable knob 30 seats on outer pan 28 and urges it axially inwardly against ring 24 of the wire basket, holding the wire basket in place. Knob 30 carries a threaded nylon bolt member 31 which extends through hole 20a in underpan 20 to engage the clip nut 18 carried on mounting bracket 13. By rotating knob 30, under certain conditions, as will become clear below, one may thread bolt 31 into nut 18, thereby providing axially inward forces on outer pan 28, the wire basket, and in turn the periphery of underpan 20 and retaining ring 21, and providing an axially outward force on bracket 13. As bolt 31 is screwed into nut 18, the central portion of the basket flexes slightly inwardly and the central portion 15 of bracket 13 flexes slightly outwardly. The inner end of bolt 31 is made bullet-nosed or rounded, which facilitates threading entry of the bolt into nut 18 even though bracket 13 will be drooping slightly, due to oversize holes 14a,16a, before threads of bolt 31 and nut 18 engage. The bent-down corners 14d,14d (FIG. 2) on bracket member 14 and similar bent-down corners on bracket member 16 engage the tire rim when the bracket droops slightly, limiting the amount which the bracket can droop before bolt 31 engages nut 18, and thereby facilitating installation. Knob 31 typically has a diameter of the order of $2\frac{1}{2}$ to 4 inches, providing sufficient mechanical advantage that it can readily be turned by hand, obviating any need for any tool such as a socket wrench or pair of pliers in order to install or remove the wheel cover. While knob 30 is shown in FIG. 5b as having an octagonal configuration, that is by no means necessary, as various other shapes may be provided. Knob 30 may be provided with "wings", for example, to resemble a spinner.

Figure 4B:
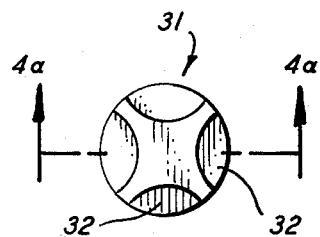
FIGS. 4a and 4b are cross-section and outer end views, respectively, of a threaded nylon bolt member portion of the locking assembly.
Figure 4A:
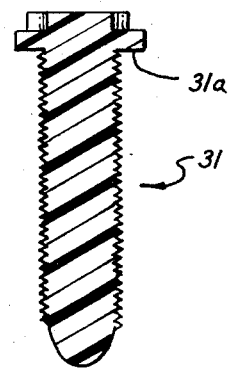
Figure 6A:
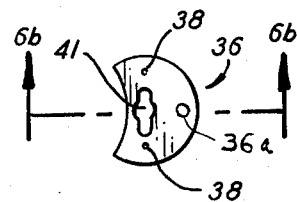
FIGS. 6a and 6b are top and cross-section views, respectively, of a cam piece portion of the assembly.
Figure 6B:
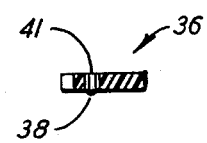

As seen in FIGS. 4a and 4b, threaded nylon bolt 31 is provided with an annular upper flange 31a, and its upper end formed with four arcuate recesses or cusps 32,32. Flange 31a of bolt 31 seats in circular central recess 33 (FIGS. 5a–5b) of knob 30 with the bolt extending through bore 34 in the knob. A circular recess 35 (FIGS. 5a,5b) which overlaps and communicates with a portion of recess 33, receives a cam piece 36 which is illustrated in FIGS. 6a and 6b. The overlap or space common to circular recesses 33 and 35 will be seen to correspond to the cutaway portion of cam piece 36. Cam piece 36 is rotatable by means of a key 37 (FIG. 8a) between two angular positions 180 degrees apart, the key engaging a shaped slot 41 extending through the cam piece, with the end of the key seating in a recess 40 in knob 30. A pair of bumps or projections 38,38 on one side of piece 36 enter small recesses 39,39 (FIG. 5b) in knob 30 at the two angular positions, detenting rotation of cam piece 36 and providing a "feel" for proper key position. In one of the two angular positions of cam piece 36, none of the cam piece extends into recess 33, and during that condition rotation of knob 30 will not rotate bolt 31, and the wheel cover cannot be removed. Extensive rotation of know 30 causes nothing to happen and causes no damage to the locking assembly. In the other of the two angular positions of cam piece 36, a portion of the cam piece fills one of the recesses 32 (FIG. 4b) at the end of bolt 31, in essence clutching or connecting knob 30 to bolt 31, so that rotation of the knob will rotate bolt 31, allowing the wheel cover assembly to be loosened and removed. Because cam piece 36 fills one of the recesses 32, knob 30 is connected to rotate bolt 31 with substantially no backlash.

Figure 7A:
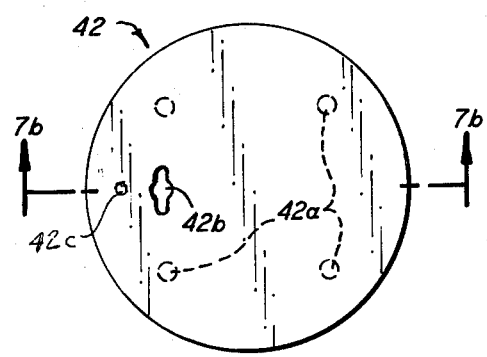
FIGS. 7a and 7b are top and cross-section views, respectively, of a removable cover portion of the assembly.
Figure 7B:
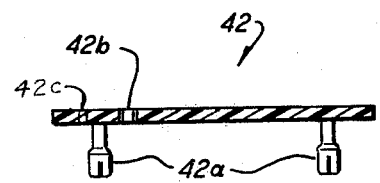

A molded plastic cover 42 illustrated in FIGS. 7a and 7b is provided with four posts 42a which snap into four holes 43 (FIG. 5b) in knob 30 to hold bolt 31 and cam 36 in place in the knob, with slot 42b situated over slot 41 and hole 40. The lower ends of posts 42a are each enlarged and provided with a slit as shown, so that they will compress while passing through a hole 43 and then expand on the underside or inside of knob 30, resiliently locking the cover in place. The cover should never have to be removed, and hence the ends of the posts may be and preferably are permanently deformed or spread by application of heat and pressure after the cover has been installed, to permanently lock the cover in place. A decorative disc 47 is snapped in place atop cover 42, hiding cover 42, and importantly, the key slot 42b in the cover, so that the manner in which the wheel cover is locked is not discernible to a prospective thief. As seen in FIGS. 5a and 5b, the edges of four portions 45 of the upper cylindrical recess 44 in knob 30 are tapered, at the angle shown as α in FIG. 5a. The angle may be 10 degrees, for example. The provision of such tapered edges allows disc 47 to snap into recess 44 but a plurality (eight are shown in FIG. 5b) of extended recesses 44a,44a then bare edge portions of disc 47, so that key 37, which is provided with a sharp end, can be inserted under an exposed edge portion of disc 43, to pry up and snap out the disc should the owner wish to remove the wheel cover. Four arcuate slots 46,46 extend through knob 30 below respective ones of the tapered edges 45, for two purposes. The slots not only allow condensation to flow from the lock, but they also allow fixed tooling to extend through the knob to form the tapered edges 45, obviating any need for a cam-type mold having movable parts in order to form the knob.

During normal use of the vehicle the assembly will be locked, with cam 36 filling recess 35 and not extending into recess 33. If moisture seeps in under disc 47 and cover 42, no significant amount of moisture can collect in recess 35 because that recess is filled by the cam piece. If moisture seeps into the recess 32 then opposite and facing the cam piece and then freezes, it could become difficult to rotate cam piece 36 with key 37; however, by simply rotating knob 30 ninety degrees a different recess 32 will be placed adjacent the cam piece. Hence frozen moisture becomes unlikely to interfere with key rotation of cam piece 36 unless all four of the recesses 32 at the top of bolt 31 were filled with ice. If ice fills key slot 41 in the cam piece, key slot 42b in the cover plate and hole 40 in knob 30, all of which are registered with each other, that ice may be readily scraped out using the sharpened end of key 37.

It will be seen that the mass of the locking assembly is substantially symmetrically disposed about the wheel axis, and that the assembly does not require any flopping cables or the like which can wear due to wheel vibration or interfere with wheel balance.

It is preferred that bolt 31 and cam piece 36 be molded from "superstrength" nylon (e.g. du Pont ST-801-BK 10). Knob 30 and cover 42 may be molded from lesser strength plastics, such as ABS, for example. Key 37 comprises a simple metal stamping.

While the invention has been illustrated for use with a three-piece wirewheel-simulating wheel cover having an underpan, basket and outer pan, it will become apparent upon reflection that major principles of the invention are applicable as well to numerous other types of wheel covers. The assembly described in connection with FIGS. 1 to 8b will be seen to be readily installable in the field by the average unskilled car owner without the use of any special tools. That fact, plus the ability of that single assembly to fit a variety of different wheel sizes and lug configurations, make the locking assembly which has been described particularly suitable for the aftermarket, i.e. for installation of wheel cover locking devices "in the field". In applying the invention to provision of original equipment for a given type of automobile having a known wheel size and wheel cover shape, a fixed mounting bracket can be substituted for the adjustable bracket 13 shown, and with elimination of that adjustability can allow the threaded nylon bolt 31 to be shorter. In FIG. 9 a fixed mounting bracket 13' secured under two lug nuts 11',11' carries a nut 18' which threadingly receives bolt 31'. Bolt 31' extends through a central hole 20a' in a one-piece wheel cover 20', with annular ribs on the inside of a modified knob 30' seating against the one-piece wheel cover.

The locking assemblies of FIGS. 1 and 9 each will be seen to retain the wheel cover on the wheel even if the spring finger retention typified by spring fingers 21a,21b slips and fails.

A small hole 42C (FIGS. 7a and 7b) is provided in cover 42, and a small colored Dot 36A (FIG. 6a) is provided atop Cam Piece 36, preferably by hot stamping. When the Cam Piece 36 has been rotated into recess 35, so that the wheel cover cannot be removed by rotation of Knob 30, the Colored Dot is visible to the owner through hole 42C, indicating to him that the assembly is in the locked condition.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The embodiments of the invention in which an exclusive property or privilege is claimed are defined as follows:

1. A locking assembly for locking a wheel cover in a vehicle wheel secured to a vehicle by a plurality of lug nuts, comprising, in combination: a mounting bracket adapted to be secured under a pair of said lug nuts and to locate a threaded nut axially outwardly from said wheel; a rotatable knob member adapted to seat against said wheel cover; a threaded bolt means rotatably journalled in said knob member and adapted to threadedly engage said threaded nut; and a cam seated within said knob member, said cam being pivotable between a first position at which rotation of said knob member causes rotation of said bolt means and a second position at which rotation of said knob member does not cause rotation of said bolt means, said knob member including first and second overlapping and intercommunicating circular recesses having a common space, said cam piece having a shape adapted to fill the first of said circular recesses but none of said common space when said cam is rotated to said second position, and adapted to fill said common space when said cam is rotated to said first position, said bolt means having a recess conforming to said common space and adapted to be filled by a portion of said cam when said cam is rotated to said first position.

2. The assembly according to claim 1 wherein said bolt means has a plurality of recesses each conforming to said common space and any of which may be filled by said portion of said cam when said cam is rotated to said first position.

3. A locking assembly for locking a wheel cover on a vehicle wheel which is secured to a vehicle by a plurality of lug nuts for rotation of said wheel about an axis, comprising, in combination: a mounting bracket adapted to be secured under a pair of said lug nuts and to locate a threaded nut axially outwardly from said wheel on said axis; a rotatable knob member adapted to seat against a central portion of said wheel cover surrounding said axis; a threaded bolt means journalled in said knob member for rotation about said axis and adapted to threadedly engage said threaded nut; and a cam seated within said rotatable knob member, said cam being pivotable between a first position at which rotation of said knob member causes rotation of said bolt means and a second position at which rotation of said knob member does not cause rotation of said bolt means, said cam comprising a disc pivotable about a pivot axis displaced from and substantially parallel to said axis of rotation of said wheel.

4. A locking assembly for locking a wheel cover on a vehicle wheel which is secured to a vehicle by a plurality of lug nuts for rotation of said wheel about an axis, comprising, in combination: a mounting bracket adapted to be secured under a pair of said lug nuts and to locate a threaded nut axially outwardly from said wheel on said axis; a rotatable knob member adapted to seat against a central portion of said wheel cover surrounding said axis; a threaded bolt means journalled in said knob member for rotation about said axis and adapted to threadedly engage said threaded nut; and a cam seated within said rotatable knob member, said cam being pivotable between a first position at which rotation of said knob member causes rotation of said bolt means and a second position at which rotation of said knob member does not cause rotation of said bolt means, said assembly having a cover affixed to said rotatable knob member to cover said cam, said cover having an aperture, and said cam carrying an indicium visible through said aperture to indicate whether said cam is in said first position or said second position.

5. A locking assembly for locking a wheel cover on a vehicle wheel which is secured to a vehicle by a plurality of lug nuts for rotation of said wheel about an axis, comprising, in combination: a mounting bracket adapted to be secured under a pair of said lug nuts and to locate a threaded nut axially outwardly from said wheel on said axis; a rotatable knob member adapted to seat against a central portion of said wheel cover surrounding said axis; a threaded bolt means journalled in said knob member for rotation about said axis and adapted to threadedly engage said threaded nut; and a cam seated within said rotatable knob member, said cam being pivotable between a first position at which rotation of said knob member causes rotation of said bolt means and a second position at which rotation of said knob member does not cause rotation of said bolt means, said cam comprising a generally-circular disc having an arcuate cutaway portion.

* * * * *